(12) United States Patent
Xie et al.

(10) Patent No.: US 9,191,412 B2
(45) Date of Patent: *Nov. 17, 2015

(54) SYSTEMS AND METHODS FOR PASSING NETWORK TRAFFIC CONTENT (71) Applicant: Fortinet, Inc., Sunnyvale, CA (US)

(72) Inventors: Michael Xie, Menlo Park, CA (US); Bing Xie, Beijing (CN)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/469,233

(22) Filed: Aug. 26, 2014

(65) Prior Publication Data

US 2014/0366088 A1    Dec. 11, 2014

Related U.S. Application Data

(63) Continuation of application No. 10/956,240, filed on Sep. 30, 2004, now Pat. No. 8,863,277.

(60) Provisional application No. 60/560,788, filed on Apr. 7, 2004.

(51) Int. Cl.
*H04L 12/24* (2006.01)
*H04L 29/06* (2006.01)
*H04L 12/801* (2013.01)
*H04L 12/813* (2013.01)

(52) U.S. Cl.
CPC ............... *H04L 63/20* (2013.01); *H04L 47/10* (2013.01); *H04L 47/20* (2013.01)

(58) Field of Classification Search
CPC ...................................................... H04L 63/20
USPC ....................................................... 726/22–25
See application file for complete search history.

(56) References Cited

U.S. PATENT DOCUMENTS

| | | | |
|---|---|---|---|
| 5,414,833 A | 5/1995 | Hershey et al. | |
| 5,793,980 A * | 8/1998 | Glaser et al. | 709/231 |
| 5,991,084 A * | 11/1999 | Hildebrand et al. | 359/629 |
| 5,991,877 A * | 11/1999 | Luckenbaugh | 726/1 |
| 6,047,377 A * | 4/2000 | Gong | 726/21 |
| 6,088,803 A * | 7/2000 | Tso et al. | 726/22 |
| 6,118,790 A * | 9/2000 | Bolosky et al. | 370/468 |
| 6,163,844 A * | 12/2000 | Duncan et al. | 726/3 |
| 6,289,462 B1 * | 9/2001 | McNabb et al. | 726/21 |
| 6,381,242 B1 * | 4/2002 | Maher et al. | 370/394 |
| 6,490,290 B1 * | 12/2002 | Zhang et al. | 370/401 |
| 6,591,084 B1 * | 7/2003 | Chuprun et al. | 455/3.05 |

(Continued)

OTHER PUBLICATIONS

U.S. Appl. No. 10-956,240, Response filed Feb. 12, 2010 to Final Office Action mailed Oct. 13, 2009 7 pgs.

(Continued)

*Primary Examiner* — William Powers
(74) *Attorney, Agent, or Firm* — Schwegman Lundberg & Woessner, P.A.

(57) ABSTRACT

A method for transmitting content data includes receiving content data, and passing at least a portion of the content data based on a size of the received content data. A method for transmitting content data includes receiving content data, and passing at least a portion of the content data based on a prescribed rate. A method for transmitting content data includes receiving content data, and passing at least a portion of the content data before performing policy enforcement on the content data.

19 Claims, 8 Drawing Sheets

(56) References Cited

U.S. PATENT DOCUMENTS

| | | | |
|---|---|---|---|
| 6,654,373 B1* | 11/2003 | Maher et al. | 370/392 |
| 6,678,332 B1* | 1/2004 | Gardere et al. | 375/240.26 |
| 6,751,620 B2* | 6/2004 | Orbanes et al. | 1/1 |
| 6,804,222 B1* | 10/2004 | Lin et al. | 370/338 |
| 7,058,970 B2* | 6/2006 | Shaw | 726/6 |
| 7,076,650 B1* | 7/2006 | Sonnenberg | 713/151 |
| 7,120,122 B1* | 10/2006 | Starr et al. | 370/250 |
| 7,310,815 B2* | 12/2007 | Yanovsky | 726/13 |
| 7,331,061 B1* | 2/2008 | Ramsey et al. | 726/23 |
| 7,415,728 B2* | 8/2008 | Morohashi et al. | 726/25 |
| 8,863,277 B2 | 10/2014 | Xie et al. | |
| 2002/0038339 A1 | 3/2002 | Xu | |
| 2002/0067696 A1* | 6/2002 | Ho | 370/235 |
| 2002/0089528 A1* | 7/2002 | Hay et al. | 345/712 |
| 2005/0138110 A1 | 6/2005 | Redlich et al. | |
| 2005/0229237 A1 | 10/2005 | Xie et al. | |

OTHER PUBLICATIONS

U.S. Appl. No. 10/956,2040, Final Office Action mailed Apr. 9, 2012, 11 pgs.

U.S. Appl. No. 10/956,240, Response filed Feb. 19, 2014 to Non Final Office Action mailed Sep. 20, 2013, 9 pgs.

U.S. Appl. No. 10/956,240, Response filed Mar. 21, 2012 to Non Final Office Action mailed Sep. 29, 2011, 7 pgs.

U.S. Appl. No. 10/956,240, Response filed May 29, 2013 to Non Final Office Action mailed Jan. 30, 2013, 7 pgs.

U.S. Appl. No. 10/956,240, Response filed Aug. 3, 2012 to Final Office Action mailed Apr. 9, 2012, 7 pgs.

U.S. Appl. No. 10/956,240, Advisory Action mailed Jan. 29, 2009, 3 pgs.

U.S. Appl. No. 10/956,240, Advisory Action mailed Aug. 15, 2012, 3 pgs.

U.S. Appl. No. 10/956,240, Advisory Action mailed Oct. 16, 2006, 3 pgs.

U.S. Appl. No. 10/956,240, Examiner Interview Summary mailed Feb. 20, 2009, 2 pgs.

U.S. Appl. No. 10/956,240, Examiner Interview Summary mailed Apr. 17, 2006, 4 pgs.

U.S. Appl. No. 10/956,240, Final Office Action mailed Feb. 19, 2008, 10 pgs.

U.S. Appl. No. 10/956,240, Final Office Action mailed Mar. 11, 2014, 11 pgs.

U.S. Appl. No. 10/956,240, Final Office Action mailed May 7, 2007, 8 pgs.

U.S. Appl. No. 10/956,240, Final Office Action mailed Jun. 6, 2013, 10 pgs.

U.S. Appl. No. 10/956,240, Final Office Action mailed Jul. 16, 2010, 9 pgs.

U.S. Appl. No. 10/956,240, Final Office Action mailed Aug. 2, 2006, 10 pgs.

U.S. Appl. No. 10/956,240, Final Office Action mailed Oct. 13, 2009, 9 pgs.

U.S. Appl. No. 10/956,240, Final Office Action mailed Oct. 14, 2008, 11 pgs.

U.S. Appl. No. 10/956,240, Non Final Office Action mailed Jan. 30, 2013, 10 pgs.

U.S. Appl. No. 10/956,240, Non Final Office Action mailed May 25, 2011, 9 pgs.

U.S. Appl. No. 10/956,240, Non Final Office Action mailed Sep. 26, 2007, 10 pgs.

U.S. Appl. No. 10/956,240, Non Final Office Action mailed Sep. 29, 2011, 10 pgs.

U.S. Appl. No. 10/956,240, Non Final Office Action mailed Nov. 28, 2005, 8 pgs.

U.S. Appl. No. 10/956,240, Non Final Office Action mailed Jan. 4, 2007, 8 pgs.

U.S. Appl. No. 10/956,240, Non-Final Office Action mailed Feb. 26, 2009, 10 pgs.

U.S. Appl. No. 10/956,240, Non-Final Office Action mailed Apr. 5, 2010, 10 pgs.

U.S. Appl. No. 10/956,240, Non-Final Office Action mailed May 29, 2008, 13 pgs.

U.S. Appl. No. 10/956,240, Notice of Allowance mailed Aug. 22, 2014, 8 pgs.

U.S. Appl. No. 10/956,240, Response filed Jan. 14, 2009 to Final Office Action mailed Oct. 14, 2008, 8 pgs.

U.S. Appl. No. 10/956,240, Response filed Jan. 28, 2008 to Non Final Office Action mailed Sep. 26, 2007, 14 pgs.

U.S. Appl. No. 10/956,240, Response filed Feb. 17, 2009 to Advisory Action mailed Jan. 29, 2009, 8 pgs.

U.S. Appl. No. 10/956,240, Response filed Apr. 9, 2007 to Non Final Office Action mailed Jan. 4, 2007, 12 pgs.

U.S. Appl. No. 10/956,240, Response filed Apr. 26, 2006 to Non Final Office Action mailed Nov. 28, 2005, 12 pgs.

U.S. Appl. No. 10/956,240, Response filed May 12, 2008 to Final Office Action mailed Feb. 19, 2008, 14 pgs.

U.S. Appl. No. 10/956,240, Response filed May 16, 2011 to Final Office Action mailed Jul. 16, 2010, 7 pgs.

U.S. Appl. No. 10/956,240, Response filed Jul. 6, 2010 to Non Final Office Action mailed Apr. 5, 2010, 8 pgs.

U.S. Appl. No. 10/956,240, Response filed Aug. 25, 2009 to Non Final Office Action mailed Feb. 26, 2009, 9 pgs.

U.S. Appl. No. 10/956,240, Response filed Aug. 25, 2011 to Non Final Office Action mailed May 25, 2011, 7 pgs.

U.S. Appl. No. 10/956,240, Response filed Aug. 29, 2008 to Non-Final Office Action mailed May 29, 2008, 13 pgs.

U.S. Appl. No. 10/956,240, Response filed Sep. 3, 2013 to Final Office Action mailed Jun. 5, 2013, 7 pgs.

U.S. Appl. No. 10/956,240, Response filed Sep. 7, 2007 to Final Office Action mailed May 7, 2007, 14 pgs.

U.S. Appl. No. 10/956,240, Response filed Sep. 27, 2006 to Final Office Action mailed Aug. 2, 2006, 14 pgs.

U.S. Appl. No. 10/956,240, Response mailed Aug. 11, 1024 to Final Office Action mailed Mar. 11, 2014, 8 pgs.

U.S. Appl. No. 13/707,204, Non Final Office Action mailed Sep. 20, 2013, 11 pgs.

U.S. Appl. No. 10/956,240, Response Filed Jan. 3, 2013 to Final Office action mailed Apr. 9, 2012, 7 pgs.

* cited by examiner

| Time Lapsed (sec) | Total data received by module 10 (kilobytes) | Total data passed by module 10 to user 14 (kilobytes) | Data passed using existing gateway products (kilobytes) |
|---|---|---|---|
| 1 | 2 | 1 | 0 |
| 2 | 4 | 2 | 0 |
| 3 | 7 | 3 | 0 |
| 4 | 9 | 4 | 0 |
| 5 | 13 | 5 | 0 |
| 6 | 14 | 6 | 0 |
|  | | 14 | 14 |

Module / Gateway performs policy enforcement

SYSTEMS AND METHODS FOR PASSING NETWORK TRAFFIC CONTENT

RELATED APPLICATION DATA

This application claims priority to U.S. patent application Ser. No. 10/956,240 filed on Sep. 30, 2004, entitled SYSTEMS AND METHODS FOR PASSING NETWORK TRAFFIC CONTENT, which claims priority to U.S. Provisional Application No. 60/560,788, filed Apr. 7, 2004, entitled, COMPUTER, SYSTEM AND METHODOLOGY FOR CONTROLLING DOWNLOAD PROGRESS AT GATEWAY, which are each expressly incorporated by reference herein.

BACKGROUND

1. Field

The field of the invention relates to computer systems and computer networks, and more particularly, to systems, networks, and methods for passing content of computer and network traffic.

2. Background

Policy enforcement is an important gateway function, which is performed between a gateway and a user. Policy enforcement performed by a gateway product may include, for examples, source verification, destination verification, user authentication, anti-virus, content scanning, content detection, and intrusion detection.

Generally, existing gateway products receive a request for policy enforcement sent by a user, perform policy enforcement, and then transmit the request to a server. In response to the user's request, the server sends a reply back to the gateway, which then performs further policy enforcement. After performing this second policy enforcement, the gateway passes the reply to the user.

The connection (i.e., the data transmission rate) between the gateway and the server is generally slower than the connection between the gateway and the user. As such, there may be a lag time before the gateway receives all of the data of a reply (or a prescribed amount of data) from the server. In addition, existing gateway products are generally configured to first receive all data of a reply from a server, and then perform policy enforcement on the reply before passing the reply to the user. Thus, the user may experience a lag time before the reply from the server reaches the user. When the user is a computer program, such as an email software or a web browser, this lag time may result in a timeout at the user side, or may give an end user the wrong impression that the reply did not come back or that a transmission error had occurred. In some cases, this lag time may lead to the user terminating or canceling the request.

Accordingly, systems and methods for passing content of computer and network traffic would be useful.

SUMMARY

In accordance with some embodiments, a method for transmitting content data includes receiving content data, and passing at least a portion of the content data based on a size of the received content data.

In accordance with other embodiments, a system for transmitting content data includes means for receiving content data, and means for passing at least a portion of the content data based on a size of the received content data.

In accordance with other embodiments, a computer product includes a set of stored instructions, an execution of which causes a process to be performed, the process comprising receiving content data, and passing at least a portion of the content data based on a size of the received content data.

In accordance with other embodiments, a method for transmitting content data includes receiving content data, and passing at least a portion of the content data based on a prescribed rate.

In accordance with other embodiments, a system for transmitting content data includes means for receiving content data, and means for passing at least a portion of the content data based on a prescribed rate.

In accordance with other embodiments, a computer product includes a set of stored instructions, an execution of which causes a process to be performed, the process comprising receiving content data, and passing at least a portion of the content data based on a prescribed rate.

In accordance with other embodiments, a method for transmitting content data includes receiving content data, and passing at least a portion of the content data before performing policy enforcement on the received content data.

In accordance with other embodiments, a system for transmitting content data includes means for receiving content data, and means for passing at least a portion of the content data before performing policy enforcement on the received content data.

In accordance with other embodiments, a computer product includes a set of stored instructions, an execution of which causes a process to be performed, the process comprising receiving content data, and passing at least a portion of the content data before performing policy enforcement on the received content data.

Other aspects and features will be evident from reading the following detailed description of the embodiments, which are intended to illustrate, not limit, the invention.

BRIEF DESCRIPTION OF THE DRAWINGS

The drawings illustrate the design and utility of various embodiments, in which similar elements are referred to by common reference numerals. In order to better appreciate how advantages and objects of the present inventions are obtained, a more particular description will be rendered by reference to specific embodiments thereof, which are illustrated in the accompanying drawings. Understanding that these drawings depict only typical embodiments, and are not therefore to be considered limiting its scope, the invention will be described and explained with additional specificity and detail through the use of the accompanying drawings.

DETAILED DESCRIPTION

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of specific embodiments of the invention, and not intended as an exhaustive description of the invention or as a limitation on the scope of the invention. In addition, an illustrated embodiment may not show all the aspects or advantages of the invention. An aspect or advantage described in conjunction with a particular embodiment is not necessarily limited to that embodiment, and can be practiced in any other embodiments, even if not so illustrated or described.

Figure 1:
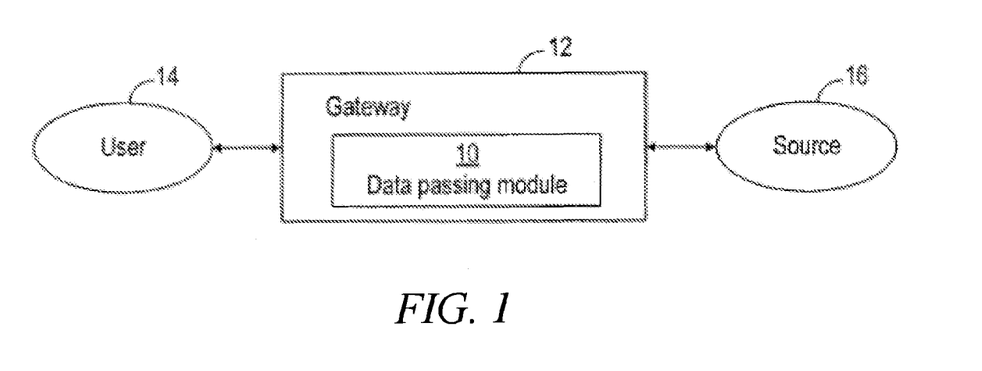
FIG. 1 illustrates a module for passing content data in accordance with some embodiments.

FIG. 1 illustrates a data passing module 10 for passing content data (e.g., data of network traffic content) in accordance with some embodiments. Module 10 is configured to receive data of content, such as web content, from a source 16, and pass at least a portion of the content data to a user 14 based on a prescribed protocol.

In the illustrated embodiments, module 10 is implemented as a component of a gateway 12 (or gateway product), which is configured to perform policy enforcement. As used in this specification, the term "policy enforcement" refers to a process or procedure, an execution of which creates a result that can be used to determine whether to pass data to user, and includes (but is not limited to) one or a combination of: source verification, destination verification, user authentication, virus scanning, content scanning (e.g., scanning for undesirable content), and intrusion detection (e.g., detecting undesirable content, such as worms, porno website, etc.). In other embodiments, instead of being a component of gateway 12, module 10 can be a separate component that is coupled to gateway 12. In other embodiments, module 10 can be a gateway product by itself, and can be implemented at any point along a communication path between source 16 and user 14. The term "user" should not be limited to a human user, and may include a server, a module, a device, a computer program, and the like, e.g., any one of a variety of devices that can receive and/or transmit information. Similarly, the term "source" should not be limited to a server, and may include a hardware, a database, a module, a device, a computer program, and the like, e.g., any one of a variety of devices that can transmit or store information.

In some embodiments, module 10 can be implemented using software. For examples, module 10 can be implemented using software that is loaded onto a computer, a server, or other types of memory, such as a disk or a CD-ROM. In some cases, module 10 can be implemented as web application. In alternative embodiments, module 10 can be implemented using hardware, and/or a combination of hardware and software. For example, in some embodiments, module 10 includes an application-specific integrated circuit (ASIC), such as a semi-custom ASIC processor, or a programmable ASIC processor. ASICs, such as those described in Application-Specific Integrated Circuits by Michael J. S. Smith, Addison-Wesley Pub Co. (1st Edition, June 1997), are well known in the art of circuit design, and therefore will not be described in further detail herein. In still other embodiments, module 10 can be any of a variety of circuits or devices capable of performing the functions described herein. For example, in alternative embodiments, module 10 can include a general purpose processor, such as a Pentium processor. In other embodiments, module 10 can be implemented using a combination of software and hardware. In some embodiments, module 10 may be implemented as a firewall, a component of a firewall, or a component that is configured to be coupled to a firewall.

Figure 2:
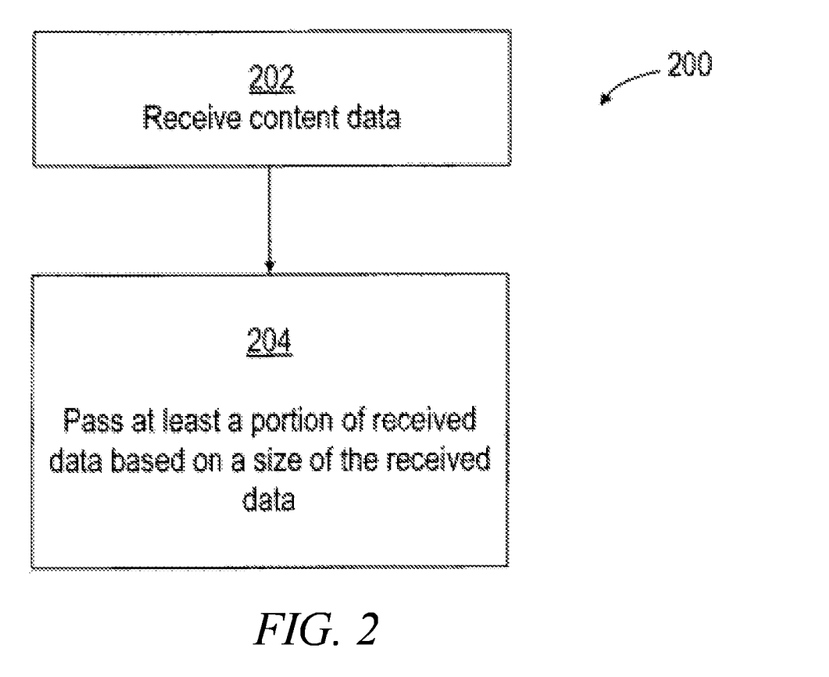
FIG. 2 illustrates a method for passing content data in accordance with some embodiments.

FIG. 2 illustrates a method 200 for passing content data in accordance with some embodiments. First, module 10 receives content data (e.g., data of content) from source 16 (Step 202). For the purpose of the following discussion, it is assumed that the content received is web-related content, such as a web page requested by user 14. However, it should be understood by those skilled in the art that method 200 of FIG. 2 can be used to pass other types of content and/or data. After content data has been received, module 10 then passes at least a portion of the received content data based on a size of the received content data (Step 204).

Figure 3:
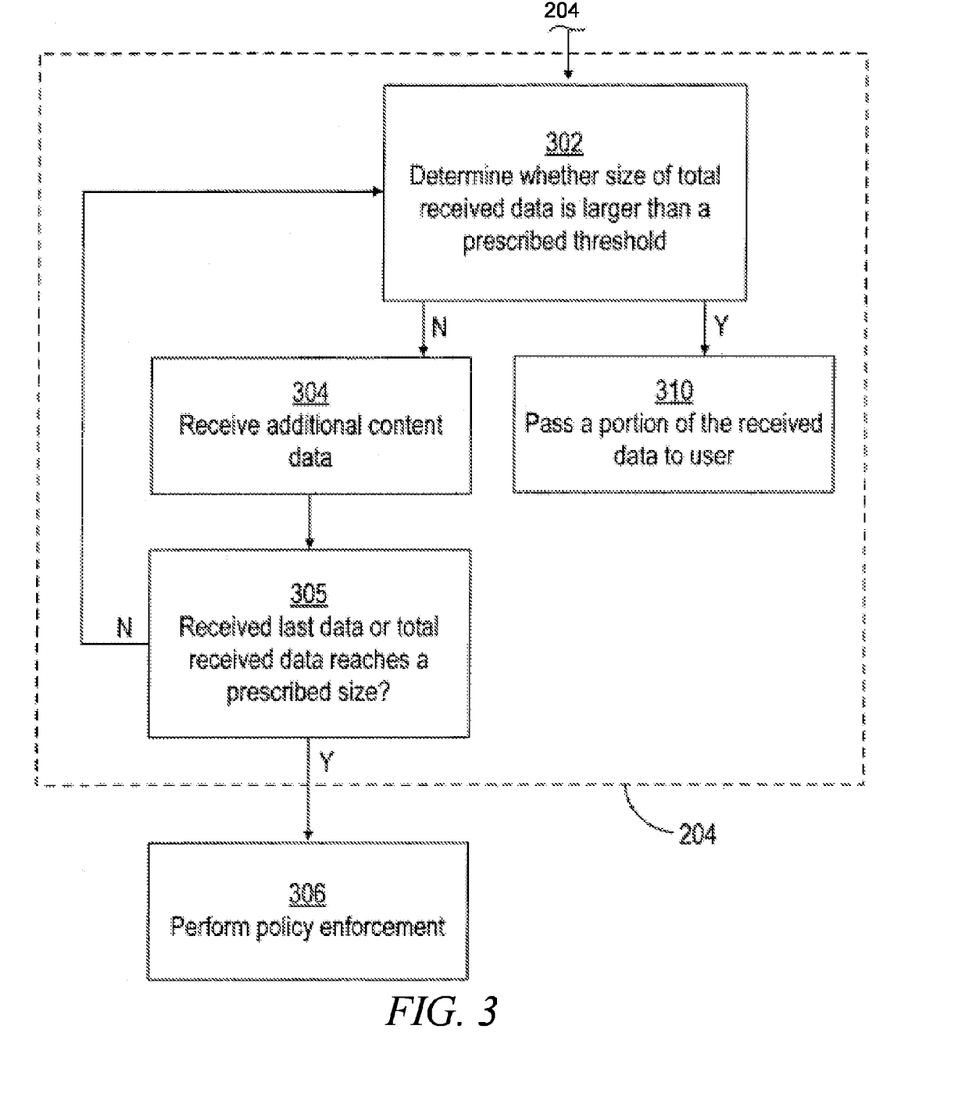
FIG. 3 illustrates a step of the method of FIG. 2 in accordance with some embodiments.

FIG. 3 illustrates step 204 of the method 200 of FIG. 2 in accordance with some embodiments. Module 10 determines whether the size of total received content data is larger than a prescribed threshold (Step 302). If the size of the total received content data is less than the prescribed threshold, module 10 receives additional content data (e.g., attempts to collect additional content, which may include an entire reply) (Step 304). As used in this specification, the term "reply" refers to any information being transmitted to user 14, and can include, for example, a web page, a portion of a web page, email, etc. Once it is determined that all data for the entire reply has been received (Step 305), module 10 then performs policy enforcement on the reply (Step 306), and passes it to user 14. In alternative embodiments, instead of collecting all content data for the reply before performing policy enforcement on the reply, module 10 performs policy enforcement on collected content data at intervals, or when a total collected content data reaches a prescribed size. Also, in other embodiments, instead of performing policy enforcement, module 10 passes content data to another module that performs policy enforcement on the content data before the content data is passed to user 14.

If the size of total received content data is more than the prescribed threshold, module 10 then passes a portion of the received content data to user 14 (Step 310). For example, if the prescribed threshold is 20 megabytes, module 10 will attempt to accumulate (or will cause gateway 12 to accumulate) 20 megabytes of content data before passing it to user 14. Thus, if the total received content data size is less than 20 megabytes, module 10 and/or gateway 12 will accumulate more content data. However, if the total received content data size is equal to or greater than 20 megabytes, module 10 and/or gateway 12 will pass the content data. In some embodiments, a user interface can be provided that allows a user 14 or an administrator to prescribe/specify the threshold for passing content data. In other embodiments, the prescribed threshold is set by default in module 10. Also, in further embodiments, the prescribed threshold varies in accordance with the type of content being transmitted. For example, email content can have a prescribed threshold that is different from that for web page content.

Various techniques can be used to pass a portion of received content data to user 14 in step 310. In the illustrated embodiments, a portion of content data is passed based on a prescribed rate. The prescribed rate can be a value that is between 0.5 kilobyte/second and 10 gigabytes/second, and more preferably, a value that is between 1.0 kilobyte/second and 50 kilobytes/second. However, the prescribed rate can be other values in other embodiments.

Figure 4:
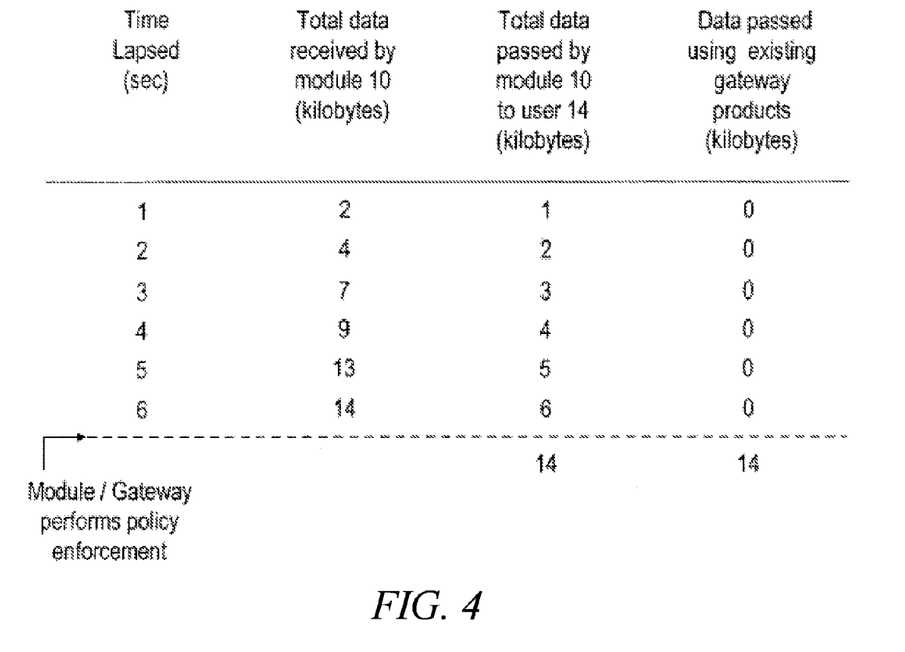
FIG. 4 illustrates an example of passing content data based on a prescribed rate.

FIG. 4 illustrates an example of passing content data at a prescribed rate. In particular, the example of FIG. 4 compares the throughput of an embodiment to that of the prior art using an illustrative prescribed rate of 1 kilobyte/second over the time of t=1 to 6 seconds (Note that the time period is illustrative, and can be anything). For example, at step 310, using the example of FIG. 4, assuming a reply is 14 kilobytes in size, and the prescribed rate is 1 kilobyte/second in such a case, module 10 will pass 1 kilobyte of content data to user 14 every second. In the example, module 10 will continue to receive the content data of a reply while passing 1 kilobyte of content data every second, until module 10 receives all 14 kilobytes of content data for the reply. Referring to FIG. 4, and as illustrated in the example, content data is passed to user 14 from t=1 second to t=6 second. This method is different from existing gateway products in which no content data is passed until after a certain time, e.g., t=6 second. As such, module 10 provides user 14 a sense of progressing as data is being transmitted to user 14. When all content data for the reply is received by module 10, module 10 then performs (or passes the reply data to another module that performs) policy enforcement on the reply, and passes the remaining content data (e.g., remaining 8 kilobytes of data) for the reply to user 14. Alternatively, instead of waiting to receive all content data for the reply, module 10 performs (or passes to another module that performs) policy enforcement when a total received content data reaches a prescribed size. It should be noted that although the previous example has been described as receiving all content data for the reply at t=6 second, in other cases, the time at which all content data for a reply is received can be different from t=6 second.

In some embodiments, a user interface can be provided that allows user 14 or an administrator to set the prescribed rate, thereby specifying how much content data will be transmitted or passed per unit time. In some embodiments, the prescribed rate is set to have a minimum value such that sufficient data is passed (at Step 310) to user 14 to provide user 14 an impression/indication that the receiving of content data is progressing (a sense of progressing). For example, if the minimum value is set to be 1 kilobyte per second, then module 10 will continue to pass at least 1 kilobyte of content data every second until it receives all of the reply, such as that illustrated previously in the FIG. 4 example. Alternatively, the minimum value can be set to be other values in other embodiments.

Alternatively, or additionally, the prescribed rate can also be set to have a maximum value to prevent too much content data from passing to user 14 (at Step 310), thereby allowing undesirable content (such as virus) to be detected during policy enforcement. The advantage of having a prescribed maximum value can be illustrated using the above example. Referring to the above example, since only 6 kilobytes of content data has been passed to user 14 at t=6 second, after all content data has been received by gateway 12, gateway 12 then performs content scanning on the 14 kilobytes of content data. In this way, gateway 12 can detect a virus of 8 kilobytes in size, for example, before passing the entire content data. On the other hand, if the prescribed rate is set to 2 kilobytes/second, then 12 kilobytes of content data would have been passed to user 14 at t=6 second. In such a case, it may be possible for a virus of 8 kilobytes in size to be passed to user 14 without being detected by gateway 12. As such, in some embodiments, it is desirable to set the prescribed rate below a maximum value.

In other embodiments, the prescribed rate is set by default in module 10. Also, in further embodiments, the prescribed rate varies in accordance with the type of content being transmitted. For example, email content can have a prescribed rate that is different from that for web page content.

Figure 5:
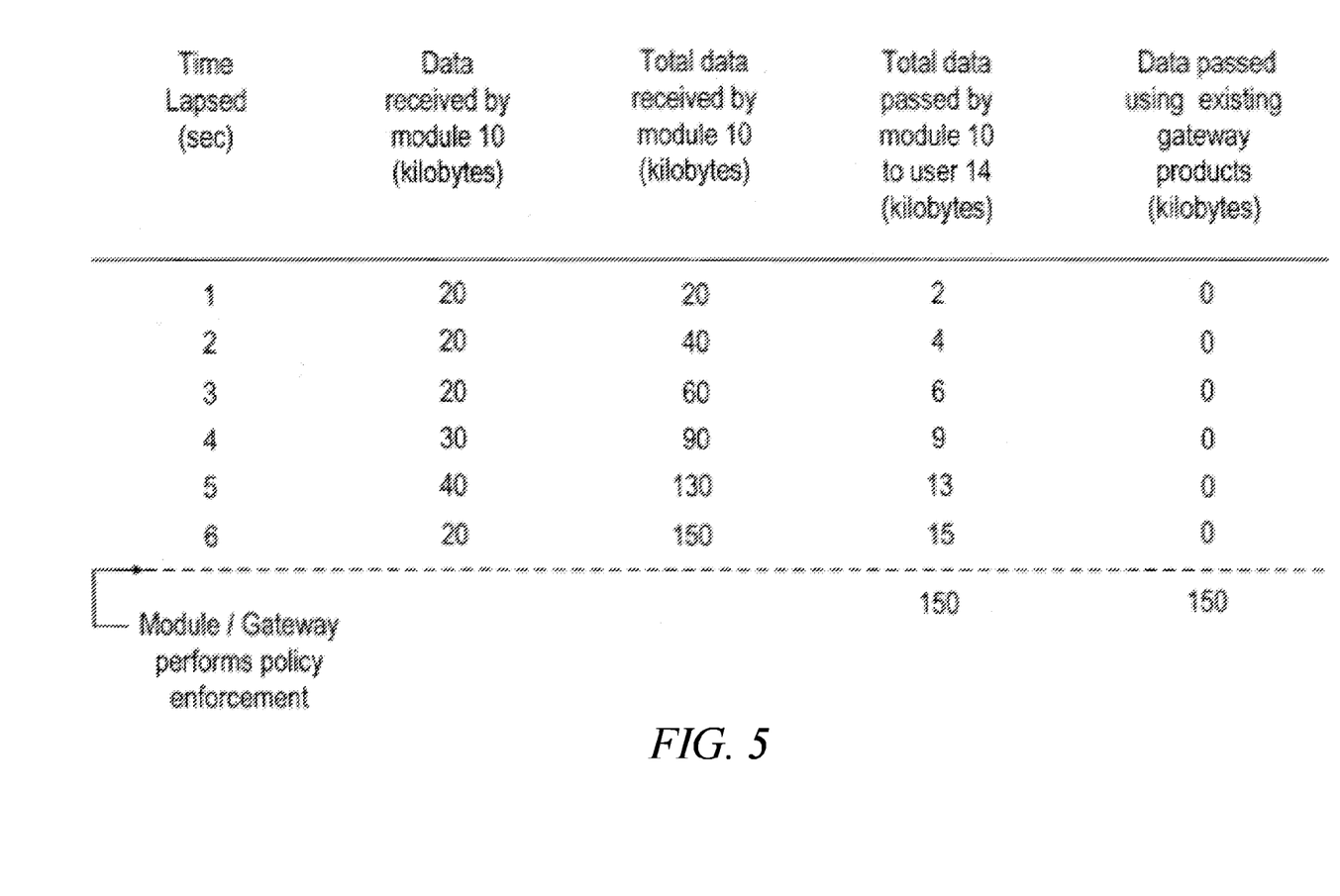
FIG. 5 illustrates an example of passing content data based on a percentage of a size of received data.

In alternative embodiments, instead of passing content data based on prescribed rate, a portion of content data is passed based on a prescribed percentage of a size of content data being received by gateway 12 or module 10. The prescribed percentage can be a value that is between 0.1% and 99%, and more preferably, a value that is between 5% and 20%. However, the prescribed percentage can be other values in other embodiments. FIG. 5 illustrates an example of passing content data based on a prescribed percentage of a size of received content data.

The example of FIG. 5 compares the content data throughput over time to the prior art using an illustrative prescribed percentage of 10% over the time of t=1 to 6 seconds, which is also illustrative. In particular, assuming a reply has a size of 150 kilobytes, if a prescribed percentage is 10%, module 10 will send (or will cause gateway 12 to send) 10% of the content data it received from source 16 to user 14. Thus, when 60 megabytes of the reply is received by module 10, 6 megabytes of content data has been passed to user 14, and when the entire reply (e.g., all 150 kilobytes of content data) is received on gateway 12, 15 megabytes of content data has been sent to user 14. As illustrated in the FIG. 5 example, content data continues to be passed to user 14 over the duration of the lapsed time, e.g., from t=1 second to t=6 second. As such, module 10 provides user 14 a sense of progressing.

In the embodiments illustrated by the example of FIG. 5, module 10 continues to receive content data for a reply while allowing received content data to be passed to user 14 based on the prescribed percentage until module 10 receives the entire reply. Module 10 (or another module) then performs policy enforcement on the reply. If the result of the policy enforcement indicates that content is appropriate to be passed, gateway 12 then passes the remainder of the content data (e.g., 135 kilobytes of content data) to user 14. Alternatively, instead of waiting to receive all of the content data for the reply, module 10 performs (or passes to another module that performs) policy enforcement when a total received content data reaches a prescribed size.

In some embodiments, a user interface can be provided that allows user 14 or an administrator to set the prescribed percentage, thereby specifying how much content data will be transmitted or passed. In some embodiments, the prescribed percentage is set to have a minimum value such that sufficient content data is passed to user 14 (at Step 310) to provide user 14 with a sense of progressing. For example, if the minimum value is set to be 10%, then module 10 will continue to pass at least 10% of received content data until it receives all of the reply, such as that illustrated previously in the FIG. 5 example. Alternatively, the minimum percentage value can be set to be other values in other embodiments.

Alternatively, or additionally, the prescribed percentage can also be set to have a maximum value to prevent too much content data from passing to user 14 (at Step 310), thereby allowing undesirable content (such as virus) to be detected during policy enforcement. The advantage of having a prescribed maximum percentage value can be illustrated using the above example. Referring to the FIG. 5 example, since only 15 kilobytes of content data has been passed to user 14 at t=6 second, after all content data has been received by gateway 12, gateway 12 then perform content scanning on the reply. In this way, gateway 12 can detect a virus of 20 kilobytes in size, for example, before passing the entire content data. On the other hand, if the prescribed rate is set to 20%, then 30 kilobytes of content data would have been passed to user 14 at t=6 second. In such a case, it may be possible for a virus of 20 kilobytes in size to be passed to user 14 without being detected by gateway 12. As such, in some embodiments, it is desirable to set the prescribed percentage below a maximum value.

In other embodiments, the prescribed percentage is set by default in module 10. Also, in further embodiments, the prescribed percentage varies in accordance with the type of content being transmitted. For example, email content can have a prescribed percentage that is different from that for web page content.

As illustrated in the above embodiments, module 10 passes at least a portion of received content data to user 14 before a complete reply is received and/or scanned. Such feature provides user 14 a sense of progressing. Partially feeding user 14 reply data also makes it less likely that an end user will have the wrong impression that nothing is happening, that the reply is not coming back, or that a transmission error had occurred.

Although several embodiments of a method for passing data from a source to a user have been described, the scope of the invention should not be so limited. In other embodiments, module 10 can be configured to pass content data using other algorithms such that a sense of progressing can be provided to user 14. Also, in other embodiments, one or more steps described previously can be combined with other step(s).

In addition, in further embodiments, a method needs not include all of the steps discussed previously. For example, in other embodiments, the step 302 of determining whether a size of total received content data is larger than a prescribed threshold is not required, and the method does not include such step.

Figure 6:
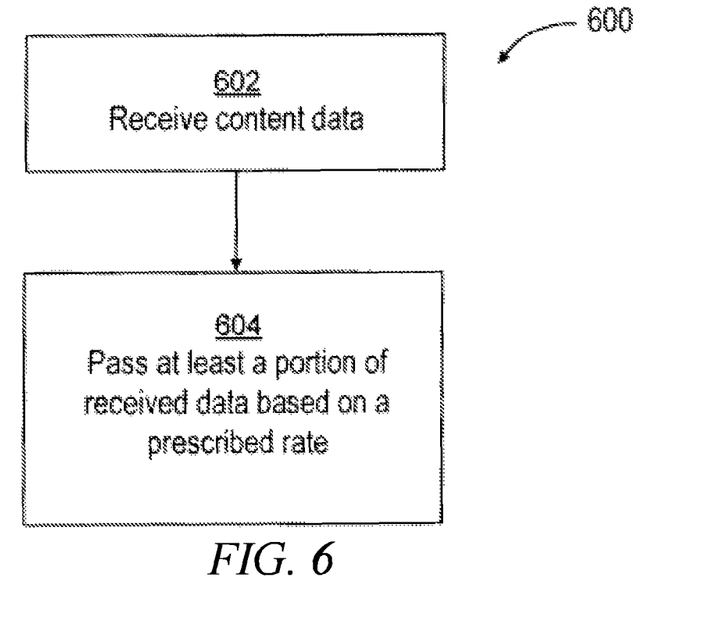
FIG. 6 illustrates another method for passing content data in accordance with alternative embodiments.

FIG. 6 illustrates a method 600 of passing content data in accordance with other embodiments, which do not include step 302. In such cases, after module 10 receives content data (Step 602), module 10 then passes (or causes gateway 12 to pass) at least a portion of the received content data based on a prescribe rate (Step 604).

Figure 7:
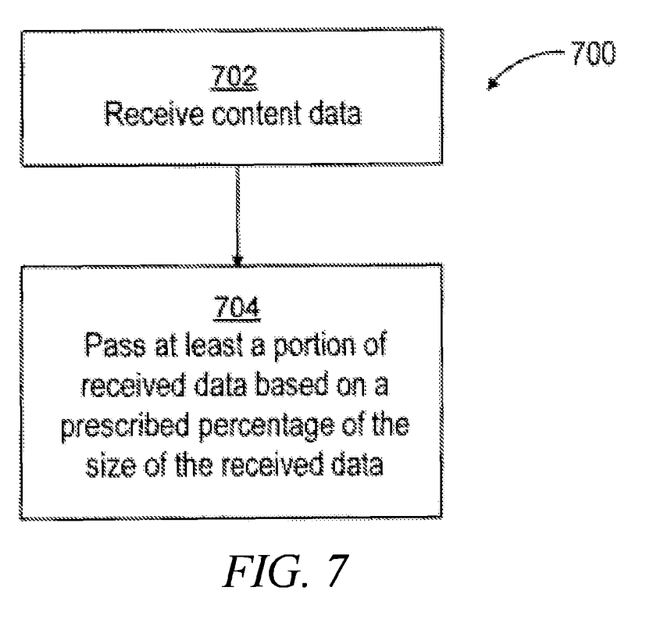
FIG. 7 illustrates another method for passing content data in accordance with alternative embodiments.

FIG. 7 illustrates another method 700 of passing content data in accordance with other embodiments, which do not include step 302. In such cases, after module 10 receives content data (Step 702), module 10 then passes (or causes gateway 12 to pass) at least a portion of the received content data based on a prescribe percentage of the size of the content (Step 704).

Although embodiments of module 10 and process 200 have been described with reference to passing web content, it should be understood that the same or similar methods and modules may also be used to pass other content, such as emails (being sent or being received), FTP, HTTP, and any electronic information. In some embodiments, module 10 includes a protocol differentiator (not shown), which examines headers of the network traffic and determines the types of content being passed. Module 10 then passes content based on prescribed protocol for the type of content. For example, if it is determined that the content is web content, then the content is passed based on a prescribed percentage of the total content. On the other hand, if it is determined that the content is an email, then a different protocol (e.g., a protocol based on prescribed rate of data per unit time) can be used to pass the content.

In some embodiments, each type of network traffic content is pre-assigned to a port of a network gateway by a default configuration. For example, HTTP, SMTP, POP, IMAP, and FTP data may each be pre-assigned to be transmitted through a designated port. In such a case, a protocol differentiator can determine a type of content based on an identification of a port transmitting the network content. In other embodiments, protocol differentiator can be configured to scan all available ports in order to determine a type of content being screened.

As discussed previously, in some embodiments, a user interface can be provided that allows the user to select criteria or parameters for passing network traffic content. For example, module 10 can allow a user to set a threshold(s), a rate at which data are passed, and/or the size of data to be passed. Also, in other embodiments, the user interface can allow a user to determine which passing protocol to use for passing data. For example, the user interface can provide a plurality of passing algorithms (e.g., data passing based on threshold value, data passing based on prescribed rate, or data passing based on size of complete reply) for a user or an administrator to select. In alternative embodiments, the user interface can allow a user to formulate and/or program customized passing protocol. In further embodiments, the user interface can allow a user to select which passing protocol to use for a certain type of network content. The user interface can be implemented using a computer in some embodiments.

Computer Architecture

As described previously, module 10 can be implemented using software, hardware, or a combination therefore. However, those skilled in the art understand that a computer system may also be used to implement module 10 to perform the same or similar functions described herein.

Figure 8:
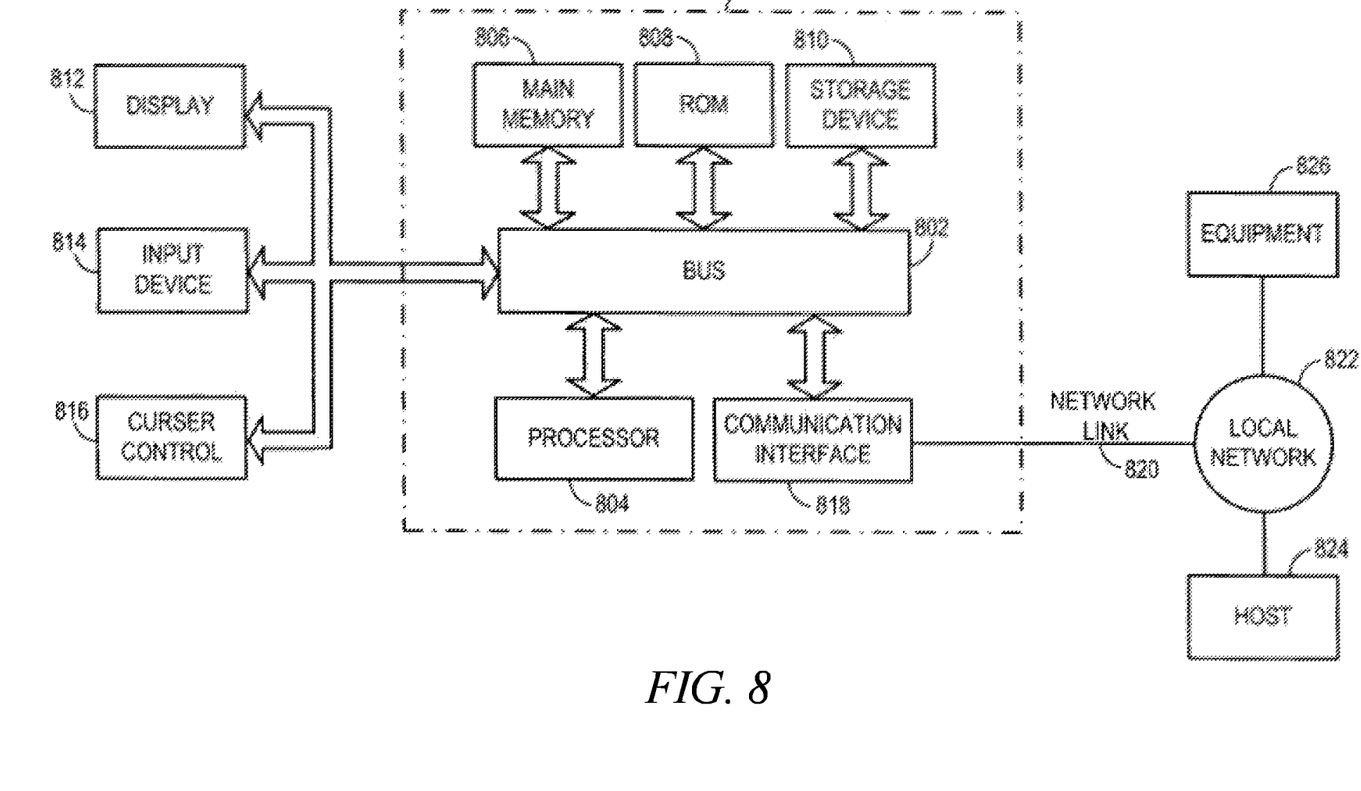
FIG. 8 is a diagram of a computer hardware system with which embodiments of the present invention can be implemented.

FIG. 8 is a block diagram that illustrates an embodiment of a computer system 800 upon which embodiments of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 may further include a read only memory (ROM) 808 or other static storage device(s) coupled to bus 802 for storing static information and instructions for processor 804. A data storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a user. An input device 814, including alphanumeric and other keys, is coupled to bus 802 for communicating information and command selections to processor 804. Another type of user input device is cursor control 816, such as a mouse, a trackball, cursor direction keys, or the like, for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Embodiments of the invention are related to the use of computer system 800 for processing content data. According to some embodiments, such use may be provided by computer system 800 in response to processor 804 executing one or more sequences of one or more instructions contained in the main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement embodiment(s) described herein. Thus, embodiments described herein are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry data streams representing various types of information.

Network link 820 typically provides data communication through one or more networks to other devices. For example, network link 820 may provide a connection through local network 822 to a host computer 824. Network link 820 may also transmits data between an equipment 826 and communication interface 818. The data streams transported over the network link 820 can comprise electrical, electromagnetic or optical signals. The signals through the various networks and the signals on network link 820 and through communication interface 818, which carry data to and from computer system 800, are exemplary forms of carrier waves transporting the information. Computer system 800 can send messages and receive data, including program code, through the network(s), network link 820, and communication interface 818. Although one network link 820 is shown, in alternative embodiments, communication interface 818 can provide coupling to a plurality of network links, each of which connected to one or more local networks. In some embodiments, computer system 800 may receive data from one network, and transmit the data to another network. Computer system 800 may process and/or modify the data before transmitting it to another network.

Although particular embodiments have been shown and described, it will be understood that it is not intended to limit the present inventions to the preferred embodiments, and it will be obvious to those skilled in the art that various changes and modifications may be made without departing from the spirit and scope of the present inventions. For example, in other embodiments, one or more functions performed by module 10 may be implemented using one or more processors or one or more software. The specification and drawings are, accordingly, to be regarded in an illustrative rather than restrictive sense. The present inventions are intended to cover alternatives, modifications, and equivalents, which may be included within the spirit and scope of the present inventions as defined by the claims.

What is claimed is:

1. A computer implemented method for transmitting a file, comprising:
   receiving data that corresponds to the file requested by a user and subject to policy enforcement;
   when an amount of received data of the file reaches a prescribed threshold size:
     transmitting a portion of the file to the user at a prescribed data transmission rate before policy enforcement has been performed on the portion of the file and before the entirety of the file has been received;
     distinct from the transmitting of the file portion to the user, performing policy enforcement upon receipt of less than an entirety of the file and at a data increment size of received data portions at least equal to a threshold data, the data increment size and the maximum data transmission rate proportional to one another, wherein:
       when a size of a received data portion upon which policy enforcement has not yet been performed is not at a data increment size at least equal to the threshold data size, waiting to perform the policy enforcement until the size of the received data is at least equal to the threshold data size; and
     after policy enforcement is performed upon an entirety of the file, transmitting the remaining portion of the file that has been received, but not yet transmitted to the user.

2. The method of claim 1, wherein the policy enforcement further comprises a process selected from the group consisting of source verification, destination verification, and user authentication.

3. The method of claim 1, wherein the file comprises webpage information.

4. The method of claim 1, wherein the prescribed data transmission rate includes a maximum data transmission rate of an amount of data per time unit to limit the amount of data transmitted before policy enforcement has been performed upon the transmitted data and a minimum data transmission rate of an amount of data per time unit that prevents a network timeout from occurring.

5. The method of claim 1, wherein the policy enforcement includes intrusion detection.

6. The method of claim 5, wherein performing the policy enforcement further includes filtering file data based upon an analysis of the file data.

7. The method of claim 1, wherein the threshold data size is a configurable setting.

8. The method of claim 7, wherein the threshold data size configurable setting includes a plurality of configuration settings, each configuration setting specifying a threshold data size with regard to at least one file type.

9. The method of claim 8, wherein the threshold data size is determined according a type of file received.

10. A computer product having a non-transitory medium having a set of stored instructions, an execution of which causes a process to be performed, the process comprising:
   receiving data that corresponds to the file requested by a user and subject to policy enforcement;
   when an amount of received data of the file reaches a prescribed threshold size:
      transmitting a portion of the file to the user at a prescribed data transmission rate before policy enforcement has been performed on the portion of the file and before the entirety of the file has been received;
      distinct from the transmitting of the file portion to the user, performing policy enforcement upon receipt of less than an entirety of the file and at a data increment size of received data portions at least equal to a threshold data, the data increment size and the maximum data transmission rate proportional to one another, wherein:
         when a size of a received data portion upon which policy enforcement has not yet been performed is not at a data increment size at least equal to the threshold data size, waiting to perform the policy enforcement until the size of the received data is at least equal to the threshold data size; and
      after policy enforcement is performed upon an entirety of the file, transmitting the remaining portion of the file that has been received, but not yet transmitted to the user.

11. The computer product of claim 10, wherein the policy enforcement further comprises a process selected from the group consisting of source verification, destination verification, and user authentication.

12. The computer product of claim 10, wherein the file comprises webpage information.

13. The computer product of claim 10, wherein the prescribed data transmission rate includes a maximum data transmission rate of an amount of data per time unit to limit the amount of data transmitted before policy enforcement has been performed upon the transmitted data and a minimum data transmission rate of an amount of data per time unit that prevents a network timeout from occurring.

14. The computer product of claim 10, wherein the policy enforcement includes intrusion detection.

15. The computer product of claim 14, wherein performing the policy enforcement further includes filtering file data based upon an analysis of the file data.

16. The computer product of claim 15, wherein the threshold data size is a configurable setting.

17. The computer product of claim 16, wherein the threshold data size configurable setting includes a plurality of configuration settings, each configuration setting specifying a threshold data size with regard to at least one file type.

18. The computer product of claim 17, wherein the threshold data size is determined according a type of file received.

19. A network device including:
   at least one network interface device;
   a file policy enforcement firmware device to receive, from the at least one network interface device, and process files flowing over a network that are subject to policy enforcement:
      receive data that corresponds to a file flowing over the network and is subject to policy enforcement;
      when an amount of received data of the file reaches a prescribed threshold size:
         transmit a portion of the file to an intended destination at a prescribed data transmission rate before policy enforcement has been performed on the portion of the file and before the entirety of the file has been received;
         distinct from the transmitting of the file portion, perform policy enforcement upon receipt of less than an entirety of the file and at a data increment size of received data portions at least equal to a threshold data, the data increment size and the maximum data transmission rate proportional to one another, wherein:
            when a size of a received data portion upon which policy enforcement has not yet been performed is not at a data increment size at least equal to the threshold data size, waiting to perform the policy enforcement until the size of the received data is at least equal to the threshold data size; and
      after policy enforcement is performed upon an entirety of the file, transmitting the remaining portion of the file that has been received, but not yet transmitted to the intended destination.

* * * * *